US012212745B2

(12) United States Patent
Bordes et al.

(10) Patent No.: US 12,212,745 B2
(45) Date of Patent: *Jan. 28, 2025

(54) METHOD AND APPARATUS FOR DEBLOCKING AN IMAGE

(71) Applicant: InterDigital VC Holdings, Inc., Wilmington, DE (US)

(72) Inventors: Philippe Bordes, Laille (FR); Franck Galpin, Thorigne-Fouillard (FR); Philippe De Lagrange, Betton (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,460

(22) Filed: Jan. 9, 2023

(65) Prior Publication Data

US 2023/0164314 A1 May 25, 2023

Related U.S. Application Data

(63) Continuation of application No. 17/311,510, filed as application No. PCT/US2019/065373 on Dec. 10, 2019, now Pat. No. 11,558,611.

(30) Foreign Application Priority Data

Dec. 11, 2018 (EP) ..................................... 18306668

(51) Int. Cl.
*H04N 7/12* (2006.01)
*G06T 9/00* (2006.01)
(Continued)

(52) U.S. Cl.
CPC ............ *H04N 19/117* (2014.11); *G06T 9/004* (2013.01); *H04N 19/105* (2014.11);
(Continued)

(58) Field of Classification Search
CPC .......................... H04N 19/189; H04N 19/635
See application file for complete search history.

(56) References Cited

U.S. PATENT DOCUMENTS

2007/0009044 A1  1/2007  Tourapis et al.
2007/0047648 A1  3/2007  Tourapis et al.
(Continued)

FOREIGN PATENT DOCUMENTS

CN   101822056 A   9/2010
CN   106464866 A   2/2017
(Continued)

OTHER PUBLICATIONS

Andersson et al, "Deblocking for multi-hypothesis intra inter prediction", Joint Video Expert Team (JVET) of ITU-T SG16 WP3 and ISO/IEC JTC 1/SC 29/WG 11, Document: JVET: M0103-v1, 13th Meeting: Marrakech, Morocco, Jan. 9, 2019, 6 pages.
(Continued)

*Primary Examiner* — Y Lee
(74) *Attorney, Agent, or Firm* — Condo Roccia Koptiw LLP

(57) ABSTRACT

Different implementations are described, particularly implementations for video encoding and decoding are presented including a method for deblocking an image. According to an implementation, in a method for deblocking an image, at least one boundary is determined between a first block of samples and a second block of samples: a boundary strength is determined according to at least one of a prediction mode of the first block and a prediction mode of the second block; and samples of the first and second blocks neighboring the at least one boundary are filtered according to the boundary strength. Advantageously, in case the prediction mode of the first block is a weighted prediction mode, the boundary strength further depends on the relative weight of samples used in predicting the first block of samples according to the
(Continued)

weighted prediction mode of the first block and reciprocally for the second block.

18 Claims, 8 Drawing Sheets

(51) Int. Cl.
*H04N 19/105* (2014.01)
*H04N 19/117* (2014.01)
*H04N 19/132* (2014.01)
*H04N 19/159* (2014.01)
*H04N 19/176* (2014.01)
*H04N 19/189* (2014.01)
*H04N 19/635* (2014.01)
*H04N 19/82* (2014.01)

(52) U.S. Cl.
CPC ......... *H04N 19/132* (2014.11); *H04N 19/159* (2014.11); *H04N 19/176* (2014.11); *H04N 19/189* (2014.11); *H04N 19/635* (2014.11); *H04N 19/82* (2014.11)

(56) References Cited

U.S. PATENT DOCUMENTS

| | | |
|---|---|---|
| 2016/0100163 A1 | 4/2016 | Rapaka et al. |
| 2017/0127090 A1 | 5/2017 | Rosewarne et al. |
| 2019/0149836 A1 | 5/2019 | Moon et al. |
| 2020/0404258 A1 | 12/2020 | Wang et al. |

FOREIGN PATENT DOCUMENTS

| | | |
|---|---|---|
| JP | 2007-503775 A | 2/2007 |
| JP | 2022-511850 A | 2/2022 |
| WO | 2009/051668 A2 | 4/2009 |
| WO | 2017/188779 A2 | 11/2017 |
| WO | 2018/219923 A1 | 12/2018 |
| WO | 2020/114513 A1 | 6/2020 |

OTHER PUBLICATIONS

Anonymous, "Series H: Audiovisual and Multimedia Systems, Infrastructure of audiovisual services—Coding of moving video—Information Technology—Generic coding of moving pictures and associated audio information: Video", International Telecommunication Union, ITU-T Telecommunication Standardization Sector of ITU, Recommendation ITU-T H.262, Feb. 2000, 220 pages.

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, 12 pages.

Anonymous, "Transmission of Non-Telephone Signals: Information Technology—Generic Coding of Moving Pictures and Associated Audio Information: Systems", International Telecommunication Union, ITU-T Telecommunication Standardization Sector of ITU, Recommendation Itu-T H.222.0, Jul. 1995, 135 pages.

Chen et al. / Chen et al, "Algorithm Description of Joint Exploration Test Model 7 (JEM 7)", Joint Video Exploration Team (JVET) of ITU-T SG16 WP3 and ISO/IEC JTC 1/SC29/WG11, Document: JVET-G1001-v1, 7th Meeting, Torino, Italy, Jul. 13, 2017, 50 pages.

Chen et al. / Chen et al, "Algorithm description for Versatile Video Coding and Test Model 2 (VTM 2)", Joint Video Experts Team (JVET) of ITU-T SG 16 WP3 and ISO/IEC JTC 1/SC 29/WG 11, Document: JVET-K1002-v2, 11th Meeting: Ljubljana, Slovenia, Jul. 10, 2018, 21 pages.

Meng et al, "AHG18/Non-CE5: Deblocking for TPM and BCW", Joint Video Experts Team (JVET) of ITU-T SG16 WP3 and ISO/IEC JTC1/SC29/WG11, Document: JVET-P0269-v1, 16th Meeting: Geneva, Switzerland, Oct. 1, 2019, 6 pages.

Norkin et al. / Norkin et al, "HEVC Deblocking Filter", IEEE Transactions on Circuits and Systems for Video Technology, vol. 22, No. 12, Dec. 2012, pp. 1746-1754.

Wang, et al., "CE10-related: Modification for blocks applied with combined inter-intra prediction", Joint Video Experts Team (JVET) of ITU-T SG 16 WP 3 and 1S0/IEC JTC 1/SC 29/WG 11, Document: JVET-M0294, 13th Meeting: Marrakesh, Morocco, Jan. 2019, 6 pages.

METHOD AND APPARATUS FOR DEBLOCKING AN IMAGE

CROSS-REFERENCE TO RELATED APPLICATIONS

This application is a continuation of U.S. patent application Ser. No. 17/311,510, filed Jun. 7, 2021, which is the National Stage Entry under 35 U.S.C. § 371 of Patent Cooperation Treaty Application No. PCT/US2019/065373, filed Dec. 10, 2019, which claims priority from European Patent Application No. 18306668.7, filed Dec. 11, 2018, the entire contents of each of which are hereby incorporated by reference herein.

TECHNICAL FIELD

At least one of the present embodiments generally relates to, e.g., a method or an apparatus for video encoding or decoding, and more particularly, to a method or an apparatus for deblocking an image.

BACKGROUND

The technical field of the one or more implementations is generally related to video compression. At least some embodiments relate to improving compression efficiency compared to existing video compression systems such as HEVC (HEVC refers to High Efficiency Video Coding, also known as H.265 and MPEG-H Part 2 described in "ITU-T H.265 Telecommunication standardization sector of ITU (10/2014), series H: audiovisual and multimedia systems, infrastructure of audiovisual services—coding of moving video, High efficiency video coding, Recommendation ITU-T H.265"), or compared to under development video compression systems such as VVC (Versatile Video Coding, a new standard being developed by JVET, the Joint Video Experts Team).

To achieve high compression efficiency, image and video coding schemes usually employ partitioning of an image, prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed into frequency-domain coefficients, the coefficients are quantized, and entropy coded. To reconstruct the video, the compressed data are decoded by inverse processes corresponding to the entropy decoding, inverse quantization, inverse transform, and prediction.

In codecs such as HEVC or VVC, the deblocking filter DBF is applied after the pictures have been reconstructed and aims at reducing blocking artefacts by smoothing the sample values near the block edges. The deblocking filter is defined using traditional square or rectangular block partitioning shapes of size at least equal to 4 samples in Luma samples. Then, the selection of the motion vectors, reference indexes and the reference deblocking samples to be used for the determination of the deblocking fitter strength is performed. For instance, Norkin et al describe principles of deblocking in "HEVC Deblocking Filter" (IEEE Transactions on Circuits and Systems for Video Technology, vol. 22 No. 12. December 2012).

In recent video codec approach, new coding (prediction) modes are considered where the prediction samples are built using combination of non-square or non-rectangular blocks (e.g. Triangle) and/or the combination of unequal (e.g. Generalized bi-prediction GBi also referred to as Bi-prediction with CU level Weights BCW) and/or spatially variable weighting (e.g. Multi-Hypothesis or Combined Inter merge Intra Prediction CIIP). It is thus desirable to adapt the deblocking filter process to such coding mode to still efficiently reduce blocking artefacts.

SUMMARY

The purpose of the invention is to overcome at least one of the disadvantages of the prior art. For this purpose, according to a general aspect of at least one embodiment, a method for deblocking a part of an image is presented. The method comprises determining at least one boundary between a first block of samples and a second block of samples, the first block and second block belonging to the part of an image to filter: determining a boundary strength according to at least one of a prediction mode of the first block and a prediction mode of the second block; and filtering the at least one boundary according to the boundary strength, i.e. filtering samples of the first and second block neighboring the at least one boundary. In case the prediction mode of the first block is a weighted prediction mode, the boundary strength further depends on the relative weight of samples used in predicting the first block of samples according to the weighted prediction mode of the first block. Naturally, the same applies for the second block without distinction: In case the prediction mode of the second block is a weighted prediction mode, the boundary strength further depends on the relative weight of samples used in predicting the second block of samples according to the weighted prediction mode of the second block. A weighted prediction mode is a coding mode wherein a prediction is obtained from a weighted combination of a first predictor determined using a first prediction mode and of a second predictor determined using a second prediction mode.

According to another general aspect of at least one embodiment, a method for encoding a block in an image encoding is presented. The method comprises reconstructing an image part; and filtering the reconstructed image part according to any one of the embodiments of the deblocking method.

According to another general aspect of at least one embodiment, a method for decoding a block of an image is presented comprising decoding a part of an image part and filtering the decoded image part according to any one of the embodiments of the deblocking method.

According to another general aspect of at least one embodiment, an apparatus for video encoding is presented comprising means for implementing any one of the embodiments of the encoding method.

According to another general aspect of at least one embodiment, an apparatus for video decoding is presented comprising means for implementing any one of the embodiments of the decoding method.

According to another general aspect of at least one embodiment, an apparatus for video encoding is provided comprising one or more processors, and at least one memory. The one or more processors is configured to implement to any one of the embodiments of the encoding method.

According to another general aspect of at least one embodiment, an apparatus for video decoding is provided comprising one or more processors and at least one memory. The one or more processors is configured to implement to any one of the embodiments of the decoding method.

According to another general aspect of at least one embodiment, a weighted prediction mode is one of a Generalized Bi-prediction, a Bi-prediction with Coding Units level Weights, a Multi-Hypothesis prediction combining intra and inter predicted samples or combining inter and inter predicted samples, a Combined Inter merge Intra Prediction combining inter merge and intra predicted samples, a Geometric prediction combining inter predicted samples according to a geometric partition of a block, a Triangle prediction combining inter predicted samples along a diagonal edge of a block.

According to another general aspect of at least one embodiment, predicting the first block of samples according to the weighted prediction mode of the first block comprises predicting a sample of the first block as weighted combination of a first predictor determined using a first prediction mode and of a second predictor determined using a second prediction mode, and the sample of the first block is considered as using the first prediction mode for determining the boundary strength in case the weight of a first predictor is above a level.

According to another general aspect of at least one embodiment, the first prediction mode is one intra prediction mode and the sample of the first block is considered as using intra prediction mode for determining the boundary strength. In a variant, the first prediction mode is intra planar prediction mode and the sample of the first block is considered as using intra prediction mode for determining the boundary strength. In a variant, the boundary strength is set to strong in case of intra prediction mode.

According to another general aspect of at least one embodiment, the first prediction mode is one inter prediction mode and the sample of the first block is considered as using inter prediction mode for determining the boundary strength. In a variant, the first prediction mode is an inter bi-directional prediction mode and the sample of the first block is considered as using inter bi-directional prediction mode for determining the boundary strength. In another variant, the first prediction mode is an inter unidirectional prediction mode and the sample of the first block is considered as using inter unidirectional prediction mode for determining the boundary strength.

According to another general aspect of at least one embodiment, the level in the determination of BS is set to zero.

According to another general aspect of at least one embodiment, the boundary strength is determined for a group of samples of the block sharing a same relative weight, the group of samples comprising at least one sample, 4×4 samples up to all samples of the block.

According to another general aspect of at least one embodiment, a non-transitory computer readable medium is presented containing data content generated according to the method or the apparatus of any of the preceding descriptions.

According to another general aspect of at least one embodiment, a signal or a bitstream is provided comprising video data generated according to the method or the apparatus of any of the preceding descriptions.

One or more of the present embodiments also provide a computer readable storage medium having stored thereon instructions for deblocking, encoding or decoding video data according to any of the methods described above. The present embodiments also provide a computer readable storage medium having stored thereon a bitstream generated according to the methods described above. The present embodiments also provide a method and apparatus for transmitting the bitstream generated according to the methods described above. The present embodiments also provide a computer program product including instructions for performing any of the methods described.

DETAILED DESCRIPTION

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another.

The various embodiments are described with respect to the encoding/decoding of an image.

They may be applied to encode/decode a part of image, such as a slice or a tile, a tile group or a whole sequence of images.

Various methods are described above, and each of the methods comprises one or more steps or actions for achieving the described method. Unless a specific order of steps or actions is required for proper operation of the method, the order and/or use of specific steps and/or actions may be modified or combined.

At least some embodiments relate to adapting the deblocking fitter DBF in the case of the blocks have been encoded with one of the following three prediction modes:
- Generalized Bi-prediction (GBi) or Bi-prediction with CU level Weights (BCW),
- Multi-Hypothesis (MH) or a simplified version called Combined Inter merge Intra Prediction CIIP,
- Geometric or Triangle mode.

Advantageously, the present principles increase the efficiency of prior art methods by preserving DBF intent and efficiency in a block-based video codec where non-square or non-rectangular blocks are supported, and/or the combination of blocks with variable weighting are supported.

Figure 1A:
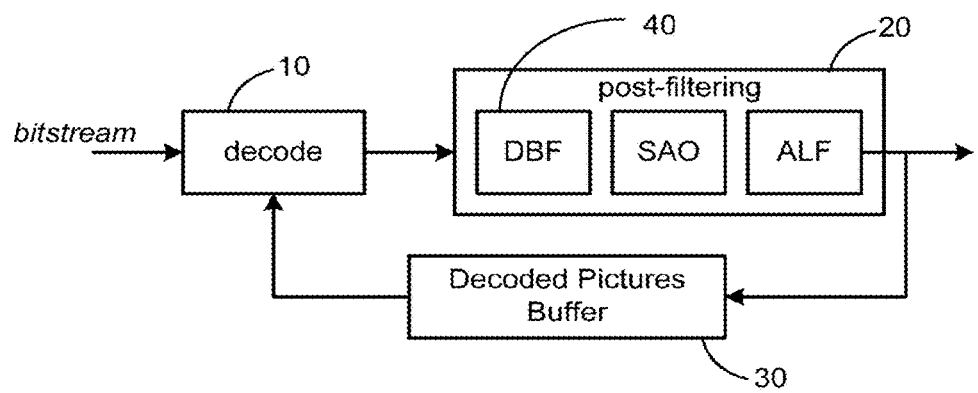
FIG. 1a illustrates of an exemplary flowchart of the in-loop post-filtering stage in a decoder architecture.

In the following, a generic embodiment for a deblocking method is disclosed and at least 3 prediction modes for which the deblocking filter is adapted are disclosed. Then, several embodiments of a modified deblocking filter are disclosed Generic Embodiment for a Deblocking Method and Exemplary Prediction Modes for Which Deblocking Filter is Adapted Traditional video coding scheme includes in-loop filtering processes for improving the quality of the reconstructed images. In-loop filtering can comprise several filtering processes such as Deblocking Filtering (DBF), Sample Adaptive Offset (SAO) filtering as in HEVC, and/or Adaptive Loop Filtering ALF such as Wiener filters. These filters can be applied successively in this order or in a different order. FIG. 1a illustrates of an exemplary flowchart of the in-loop post-filtering stage in a decoder architecture. Typically, the deblocking filter (DBF) is one of the coding artefacts reduction post-filters (20) and is applied after the block samples have been reconstructed (10). The post-filtered pictures can be displayed and are possibly stored in the decoded picture buffer (30) to be used for building the motion compensated prediction.

Advantageously, the same in-loop post filtering is also used in the encoder for reconstructed images used in temporal prediction.

Figure 1B:
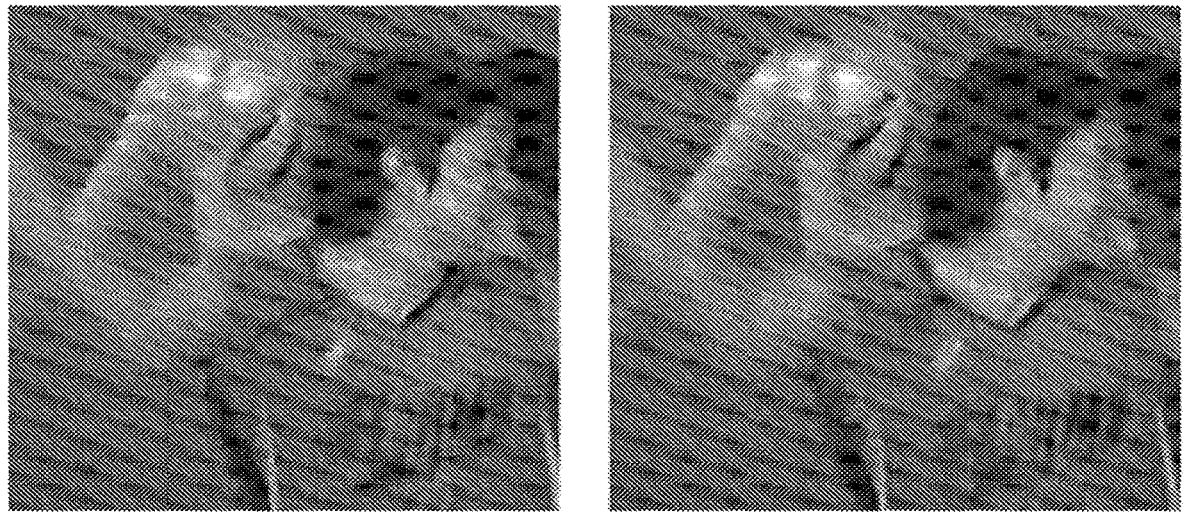
FIG. 1b illustrates of an example of a decoded image before deblocking filter (left) and after (right).

FIG. 1b illustrates of an example of a decoded image before deblocking filter (left) and after deblocking filter (right). The deblocking filter is applied after the pictures have been reconstructed (10). It aims at reducing blocking artefacts by smoothing the sample values near the block edges as illustrated on FIG. 1b.

Figure 2:
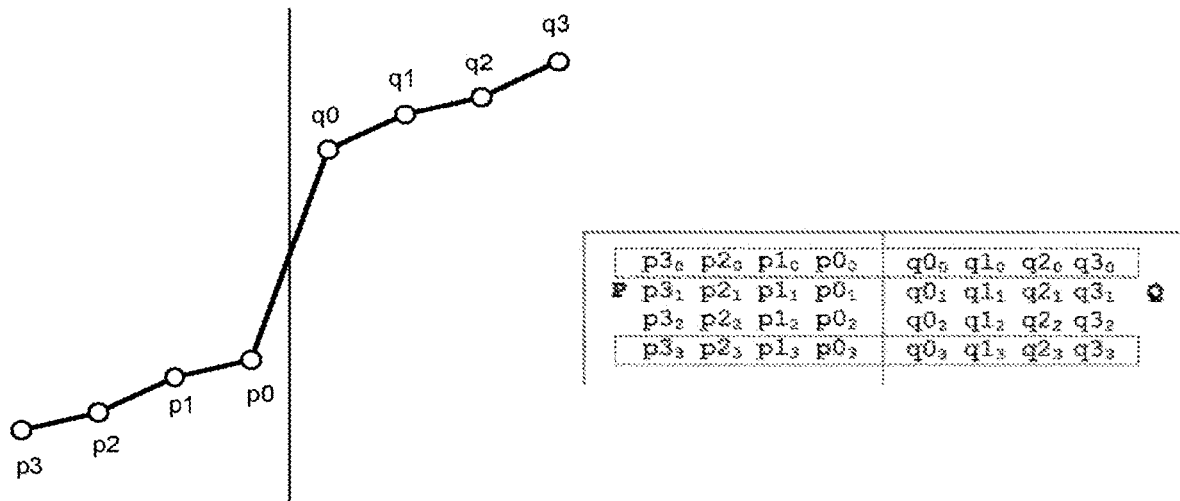
FIG. 2 illustrates an example of block boundary samples with a blocking artefact (left) between 2 blocks of samples (right).

FIG. 2 illustrates an example of block boundary samples with a blocking artefact (left) between 2 blocks P and Q of samples (right). The samples P={p0,p1,p2,p3} and Q={q0,q1,q2,q3} belong to two adjacent blocks P and Q. The samples belongs to square 4×4 blocks P and Q as shown on the right of FIG. 2 where the second index i in samples P={$p0_i$,$p1_i$,$p2_i$,$p3_i$} is the line index in the 4×4 block. In general, the artefact visibility is proportional to the relative difference between samples values P and Q as shown on the left of FIG. 2. That is why, the DBF filtering performs sample smoothing S across the block edges. The smoothing/filtering function S parameters are:
- Boundary strength (BS)={0-weak, 1-normal or 2-strong}
- Sample values of the blocks P, Q The determination of DBF parameters for a square block is carried-out for each set of line (or column) samples on each side of a vertical (resp, horizontal) boundary {$p3_i$, $p2_i$, $p1_i$, $p0_i$, $q0_i$, $q1_i$, $q2_i$, $q3_i$}.

Figure 3:
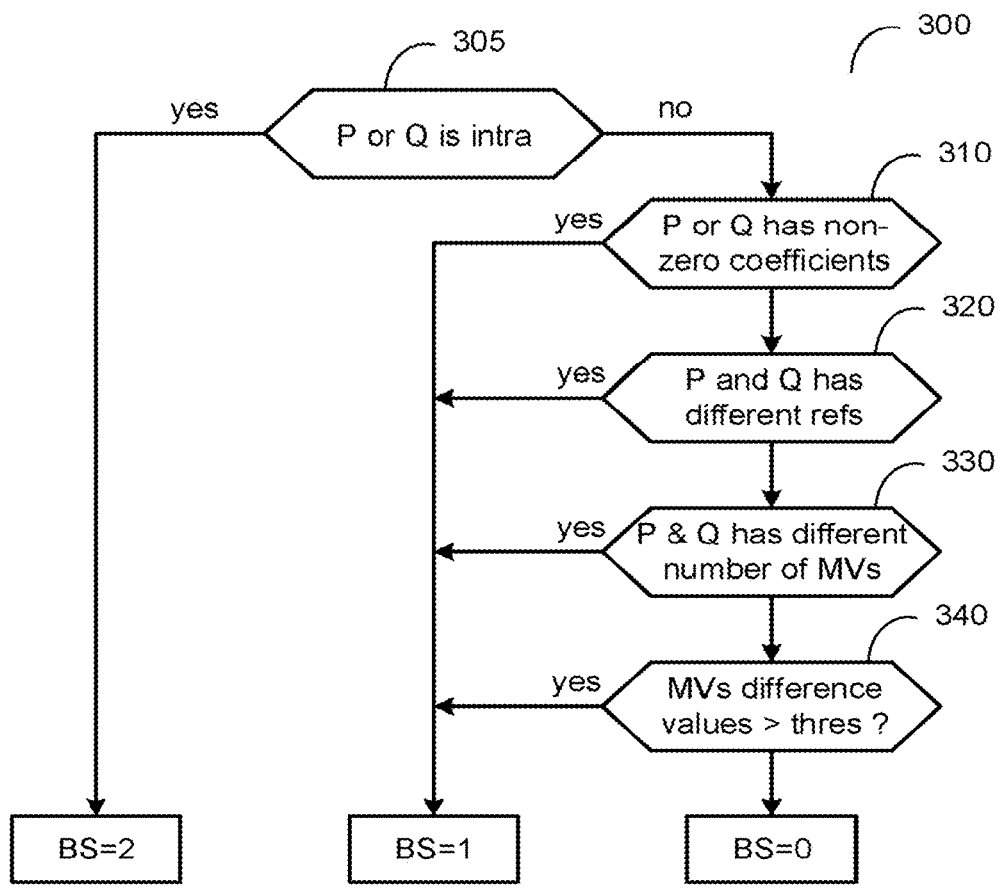
FIG. 3 illustrates an exemplary flowchart of the determination of the Boundary Strength (BS) parameter in a deblocking filter method according to a particular embodiment.

FIG. 3 illustrates an exemplary flowchart of the determination 300 of the Boundary Strength (BS) parameter in a deblocking filter method according to a particular embodiment. Let's denote {$MVi_x$,$ref\text{-}i_x$} the motion vector MV value and reference index for the list *i* for the block X (X=P or Q). By convention, if the block X is uni-directionally predicted with list-0, then {$MV0_x$ is set to zero and $ref\text{-}0_x$ is set to "−1"}. Respectively, if the block X is uni-directionally predicted with list-1, then {$MV1_x$ is set to zero and $ref\text{-}1_x$ is set to "−1"}.

The determination 300 of Boundary Strength BS depends of several block parameters and turns out in successive checks. For example, the checks are:
- (305): P or Q is intra (else considered as inter). In case of the check results in no, then both P and Q block are inter predicted, with associated motion vectors and reference index pictures, and further check are processed to determine BS. In case P or Q is intra, the check results in yes, the BS is set to 2-strong.
- (310): P or Q has non-zero coefficients and the boundary is transform boundary.
- (320): P and Q have different reference indexes. Thus according to a non-limiting example, if P is bi-predicted ({$MV0_P$,$ref\text{-}0_P$}, {$MV1_P$,$ref\text{-}1_P$}) and Q is uni-directional predicted {$MV0_Q$, $ref\text{-}0_Q$}, then check if:

$$\text{ref-}0_P \neq \text{ref-}0_Q \text{ and ref-}1_P \neq \text{ref-}0_Q \quad \text{(check.1)}$$

- (330): P and Q have different number of reference (uni-directional or bi-prediction). In a variant, (330) is not present and in uni-dir, the MV value of the missing reference is inferred to be zero.
- (340): P and Q motion vectors with same reference have different values. Thus according to a non-limiting example, if P is bi-predicted ({$MV0_P$,$ref\text{-}0_P$}, {$MV1_P$,$ref\text{-}1_P$}) and Q is uni-directional predicted {$MV0_Q$,$ref\text{-}0_Q$}, then check if:

$$\text{if ref-}0_P = \text{ref-}0_Q \text{ and } |MV0_P - MV0_Q| > \text{threshold}$$

$$\text{or if ref-}1_P = \text{ref-}0_Q \text{ and } |MV1_P - MV0_Q| > \text{threshold} \quad \text{(check. 2)}$$

The skilled in the art will non ambiguously derive the checks in case of 2 bi-predicted blocks or 2 uni-predicted blocks from above equations of (check. 2).

In case of block of Luma samples, only block boundaries with BS equal to 1 or 2 are filtered. In case of block of Chrome samples, only block boundaries with BS equal to 2 are filtered.

Figure 4:
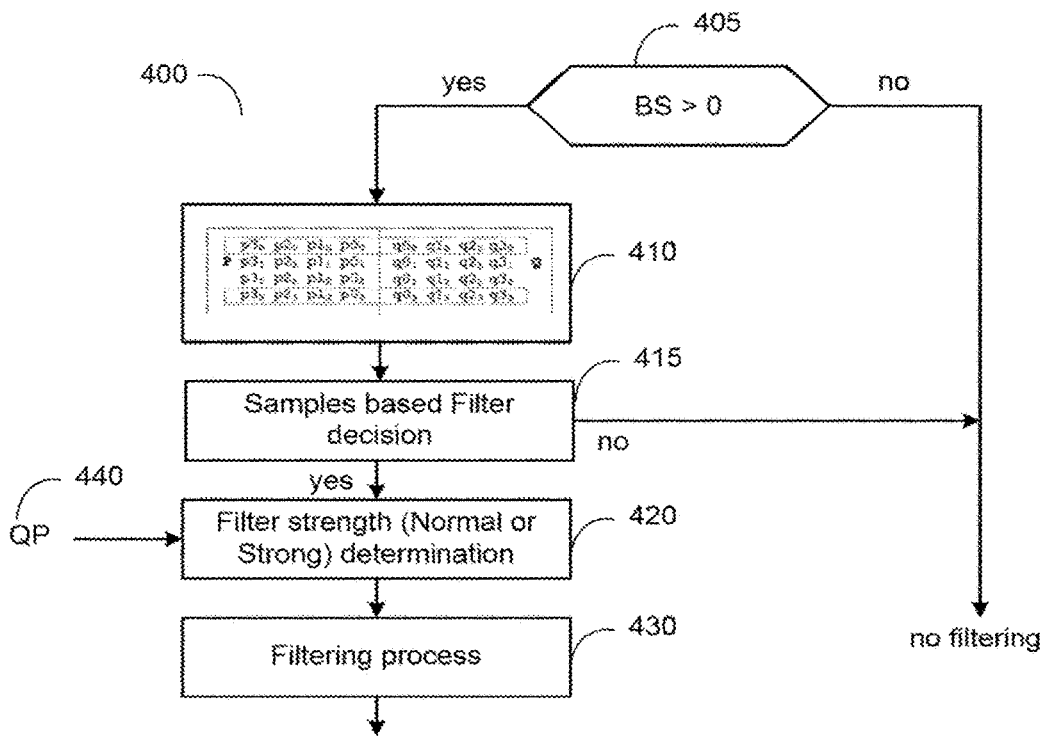
FIG. 4 illustrates an exemplary flowchart of the determination of the Filter Strength (FS) in a deblocking filter method according to a particular embodiment.

FIG. 4 illustrates an exemplary flowchart of the determination of the Filter Strength in a deblocking filter method according to a particular embodiment. Thus, independently to the way BS is determined (300), an additional test (415) determines whether filtering applies or not, based on a set of conditions involving combination of absolute differences of weighted sample values compared to a pre-determined threshold β:

$$|p2_0 - 2p1_0 + p0_0| + |p2_3 - 2p1_3 + p0_3| + |q2_0 - 2q1_0 + q0_0| + |q2_3 - 2q1_3 + q0_3| > \beta \quad \text{(eq.1)}$$

If the filter applies, the filtering process (430) modifies one or more of the P,Q samples in each side of the boundary of FIG. 2 depending on the samples values (410 accessing sample values). The strength of the filtering process (normal or strong) is determined (420) for each line (resp, column) of samples on each side of the boundary, based on a set of conditions involving combination of absolute differences of weighted sample values compared to pre-determined thresholds. Some thresholds are function of the quantization parameter (QP) (440).

The number of samples modified by (430) on each side of the block boundary depends on the filter strength. The stronger filter strength affects more pixels on each side of the block boundary.

At least 3 new prediction modes involving weighted prediction with unequal or spatially variable weights in the block and for which the deblocking filter is adapted are now disclosed.

A First Prediction Mode for which Deblocking Filter is Adapted: Generalized Bi-Prediction (GBI)

In case of bi-prediction, two prediction blocks are computed and combined with weighted sum to obtain the final block prediction as follows:

$$P_{GBi} = (((1<<gs) - gw_1) \cdot P_0 + gw_1 \cdot P_1) >> gs \quad (eq.2)$$

In the WC reference software (VTM), the weights to use are coded per CU with a "gbi-index" which values are depicted in Table 1.

TABLE 1

Binarization of GBi index and associated weights.

| GBi Index | Weight value of $w_1$ | $gw_1$ | gs (shift) | Binarization of GBi Index |
|---|---|---|---|---|
| 0 | −1/4 | −1 | 2 | 0000 |
| 1 | 3/8 | 3 | 3 | 001 |
| 2 | 1/2 | 1 | 1 | 1 |
| 3 | 5/8 | 5 | 3 | 01 |
| 4 | 5/4 | 5 | 2 | 0001 |

Hereafter, the weight pair {½; ½} will be called the default weights.

A Second Prediction Mode for Which Deblocking Filter is Adapted: Multi-Hypothesis The general concept of Multi Hypothesis MH is to combine an inter prediction P0 (which can be uni-directional or bi-predicted) performed in merge mode (where a list of merge candidates {reference index, motion values} is built and a merge index identifying one candidate is signaled to acquire motion information for the motion compensated inter prediction) with another prediction P1 that is one of an intra prediction (MH-inter-intra) or another inter prediction (MH-inter-inter e.g. uni-prediction AMVP, skip and merge). The final prediction is the weighted average of the merge indexed prediction and the prediction generated by the other prediction mode (intra or inter), where different weights are applied depending on the combinations.

Figure 5:
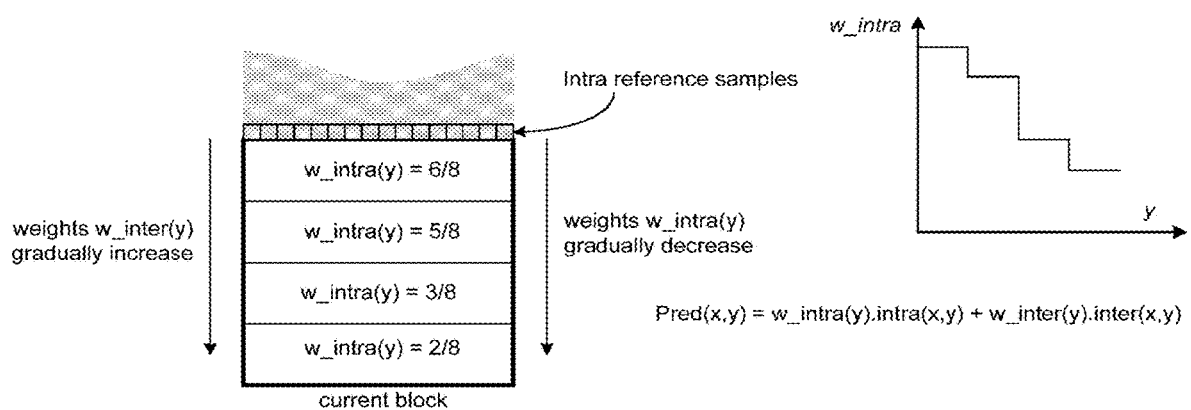
FIG. 5 illustrates of an example of a multi-hypothesis prediction in case of inter and intra modes combination.

FIG. 5 illustrates of an example of a multi-hypothesis prediction in case of inter and intra modes combination MH-inter-intra. The intra prediction mode is signaled (it can be a subset (e.g. 4) of classical prediction modes), The weights w_intra(y) gradually decrease as the region is far from the intra reference samples. According to a non-limiting example, the current block is split into 4 equal-area regions sharing same weighting. Each weight set, denoted as (w0=w_intra$_i$, w1=w_inter$_i$), where i is from 1 to 4 and (w_intra$_1$, w_inter$_1$)=(6, 2), (w_intra$_2$, w_inter$_2$)=(5, 3), (w_intra$_3$, w_inter$_3$)=(3, 5), and (w_intra$_4$, w_inter$_4$)=(2, 6), are applied to a corresponding region, as depicted in example of FIG. 5 for intra vertical direction prediction. When DC or planar mode is selected, or the CU width or height is smaller than 4, equal weights are applied. In other words, when the intra prediction mode of the prediction P1 is DC or planar mode, the relative weight used in the prediction of any sample of the current block is w0=w_intra=½ and w1=w_inter=½. Accordingly, there is only one region of equal weight (i=1). The coding mode Combined Inter merge Intra Prediction CIIP defined in WC is a particular example of MH-Inter-Intra that combines an inter prediction P0 (which can be uni-directional or bi-predicted) performed in merge mode with another prediction P1 that is a planar intra prediction with equal weight ½.

According to another example of a multi-hypothesis prediction in case of inter and inter modes combination MH-inter-inter, the weights are default ones (½; ½). According to other variant examples of MH-inter-inter mode, one or two of the inter modes is bi-prediction {2 MVs, 2 references}, so that the building of the sample predictions requires the computation of up to 4 motion compensations.

Figure 6:
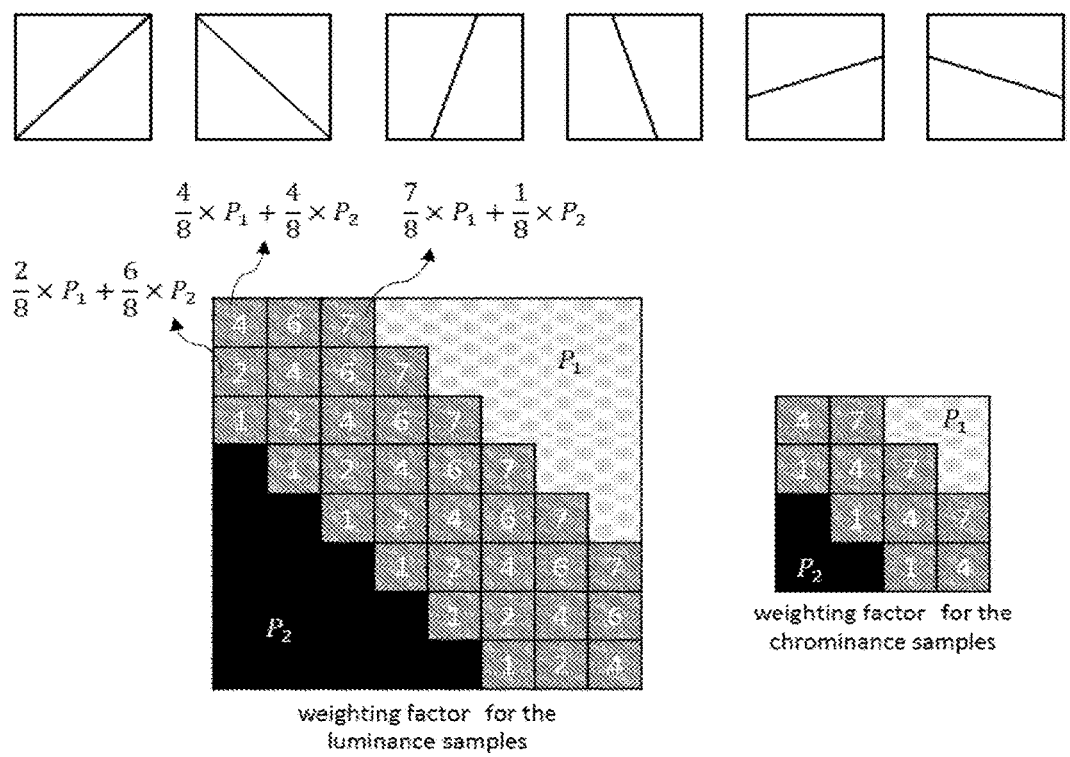
FIG. 6 illustrates of examples of a non-rectangular partitioning (top) and an example of overlap block motion compensation diagonal weighting associated to a triangle partitioning (bottom).

A Third Prediction Mode for which Deblocking Filter is Adapted: Geometric Partitioning The geometric (e.g. triangular) modes allows more flexibility for partitioning the picture into blocks before coding. FIG. 6 illustrates examples of a non-rectangular partitioning (top) and an example of overlap block motion compensation diagonal weighting associated to a triangle partitioning (bottom). The 2 left examples on the top of FIG. 6 represents triangle partitions while the 4 right examples on the top of FIG. 6 represents more generic schemes of geometric partitioning. Additional coding performance is obtained when blending overlapped boundaries for instance along the diagonal edge as shown on the bottom of FIG. 6. Accordingly, a luma sample with a weighting factor of 4 located on the diagonal of the block uses equal weights of ½ ($W_1 = W_2 = 4/8 = ½$) while a luma sample neighboring the diagonal of the block with a weighting factor of 2 uses weights of ($W_1 = 2/8 = ¼$ and $W_2 = 6/8 = ¾$). In some variant examples, this weighting process cascades with other weightings such as GBI or Local Illumination Compensation LIC and increases the implementation complexity.

In case of Triangle partitioning, the samples can be split in 2 groups:
- Samples predicted with uni-directional motion-compensation (P0 or P1)
- Samples predicted with bi-prediction motion-compensation, blending of uni-directional prediction P0 and uni-directional prediction P1.

As previously explained at least theses 3 coding modes with weighted prediction raises issue while assessing the boundary strength or filter strength in a deblocking filter.

Several Embodiments of a Modified Deblocking Filter Adapted to New Prediction Modes At least one embodiment of the present principles relates to modifying the deblocking filter DBF in the case the blocks are encoded using combination of non-square or non-rectangular blocks (e.g. Triangle) and/or the combination of unequal (e.g. GBi) and/or spatially variable weighting (e.g. MH). Advantageously, the non-square or non-rectangular blocks, as illustrated for the triangle partition or more generally for geometric partition, are considered as a combination of 2 predictions with spatially variable weighting as illustrated on FIG. 7.

Advantageously, in at least one embodiment, the DBF process (filter strength derivation and filtering) is modified to keep the original DBF intent and efficiency and thus increases its efficiency compared to prior art methods.

Figure 8:
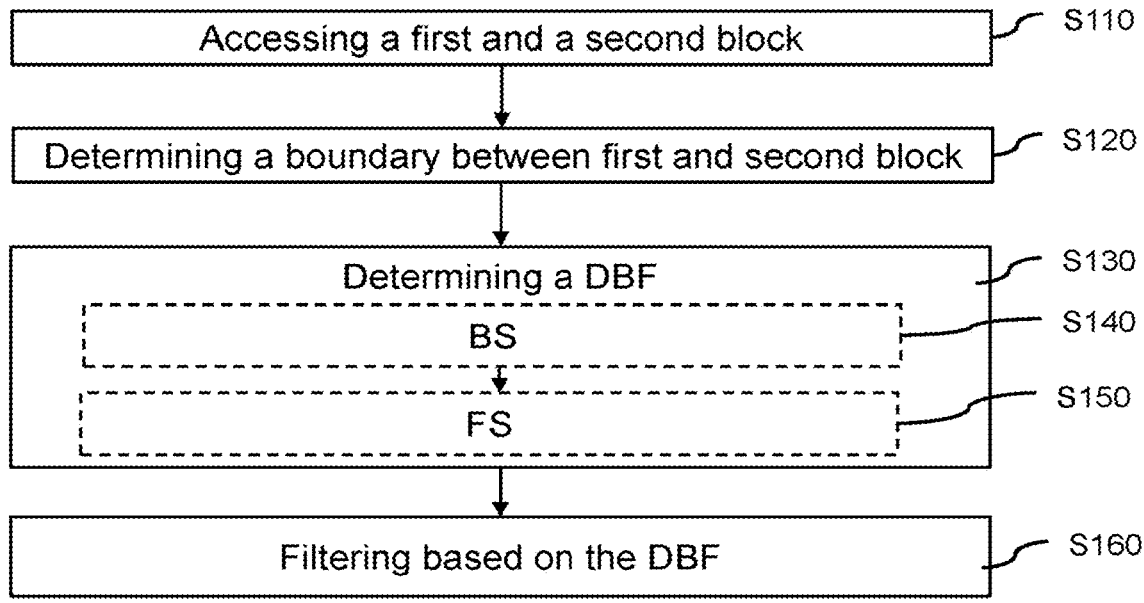
FIG. 8 illustrates an example of a method for deblocking a part of an image according to a general aspect of at least one embodiment.

FIG. 8 illustrates an example of a method for deblocking a part of an image according to a general aspect of at least one embodiment. According to a preliminary step S110, information relative to 2 neighboring blocks is accessed. The 2 neighboring blocks are tatter on called a first block P and a second block Q and they are interchangeable without restriction. The terms first and second may be used herein to describe 2 blocks, these 2 blocks should not be limited by these terms. These terms are only used to distinguish one element from another. The first block P and second block Q belongs to the part of the image to filter. A block of samples is, according to non-limiting examples, one of Coding Unit or a Transform Unit. In a first step S120, at least one boundary between the first block P of samples and the second block Q of samples is determined. In a particular embodiment, a flag EdgeFlag is set to one for a sample at a boundary to filter with DBF and the flag EdgeFlag is set to zero for a sample that is not to be filtered with DBF. A sample that is not to be filtered with DBF comprises a sample at the boundary of the image or at the boundary of a slice or a sample inside (not a boundary sample) a block, e.g. a coding unit or a transform unit. A boundary is either a horizontal boundary (horizontal edge) or a vertical boundary (vertical edge). In a step S130, at least one parameter of the DBF is determined. As previously exposed, the at least one parameter of the DBF comprises the boundary strength BS of the filter, and the filter strength FS. The boundary strength BS is selected among weak (BS=0), normal (BS=1), or strong (BS=2) values. The filter strength FS refers to the result of a decision process regarding applying the filter or not and affecting more or less pixels on each side of the block boundary. The decision process comprises at least one condition on the value of samples of the first block P and the second block Q. In a step S140, the boundary strength BS is determined according to at least one of a prediction mode of the first block and a prediction mode of the second block.

Advantageously, the boundary strength BS is adapted for prediction mode being a weighted prediction mode combining a first prediction with a second prediction. According to a particular characteristic, in case the prediction mode of the first block is a weighted prediction mode, the boundary strength BS further depends on the relative weight of samples used in predicting the first block of samples according to the weighted prediction mode of the first block. According to a particular characteristic, a weighted prediction mode is one of the previously described coding mode comprising a Generalized Bi-prediction GBi also referred to as Bi-prediction with Coding Units level Weights BCW, a Multi-Hypothesis prediction combining intra and inter predicted samples MH-inter-intra or combining inter and inter predicted samples MH-inter-inter, a Combined Inter merge intra Prediction combining inter merge and intra predicted samples, a Geometric prediction combining inter predicted samples according to a geometric partition of a block, a Triangle prediction combining inter predicted samples along a diagonal edge of a block. Various embodiments for determining the BS are explained here after.

According to a particular embodiment wherein predicting the first block of samples according to a weighted prediction mode of the first block comprises predicting a sample of the first block as weighted combination (w0, w1=1−w0) of a first predictor P0 determined using a first prediction mode and of a second predictor P1 determined using a second prediction mode, and wherein the sample of the first block is considered as using the first prediction mode for determining the boundary strength in case the weight w0 of a first predictor is above a level.

According to other particular embodiment, the number of samples in the block with the weight w0 of a first predictor is above a level determines the mode to use for the first black in BS.

According to a particular, variant the level is set to zero. According to another particular variant, the boundary strength is determined for a group of samples of the block sharing a same relative weight. According to non-limiting examples, a group of samples comprises one sample, or 4×4 samples and up to all samples of the block. Then in a step S160, the DBF filtering process is applied to the first and second block along the boundary according to the determined boundary strength BS.

In previous approach, the choice of DBF parameters for one rectangular or square block is carried-out for each set of line (or column) samples on each side of a vertical (resp. horizontal) boundary $\{p_{3i}, p_{2i}, p_{1i}, p_{0i}, q_{0i}, q_{1i}, q_{2i}, q_{3i}\}$ as illustrated on FIG. 2. However, to facilitate implementation it is generally preferred to manage/set the DBF parameters per group of samples such as 4×4 sub-blocks for example.

Accordingly, in the following, the embodiments are described in the case where DBF parameters for the current block are set per group of samples of size 4×4 sub-blocks. However, the present principles are not limited to determining DBF parameters for 4×4 sub-blocks. The skilled in the art will straightforwardly deduce parameter from the below examples for other size or even per single line (or single column). Then, the block is partitioned into a set of sub-blocks and the same DBF parameters (e.g. BS) are derived for all the samples of the sub-blocks, except the DBF parameters (e.g. filtering strength) related to the sample values in one line (resp. column).

Figure 7:
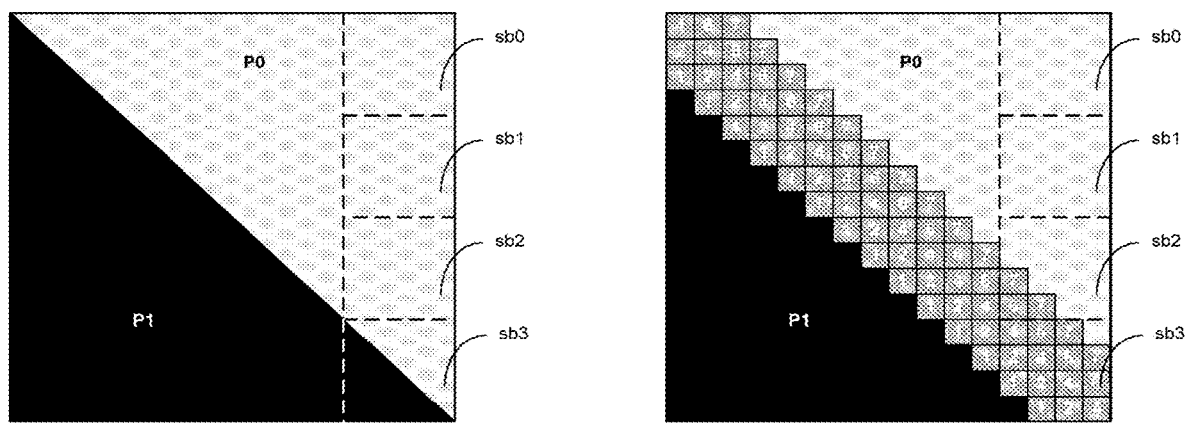
FIG. 7 illustrates of an example of a triangle logical partitioning (left) and a blending map (right) according to a particular embodiment.

FIG. 7 illustrates of an example of a triangle logical partitioning (left) and a blending map (right) according to a particular embodiment. In case of non-rectangular partitioning such as Triangles for example, it may happen some samples of one sub-block are predicted with uni-directional prediction and others are predicted with bi-prediction (blending of two uni-directional predictions). On the left of FIG. 7, the subblock sb2 illustrates a sub-block predicted with uni-directional prediction while subblock sb3 illustrates a sub-block predicted with bi-prediction. In this case, if the choice of BS is made individually for each sample, the BS may be different per sample because the steps 320,330, 340 may give different results.

In the following, we will associate to each sub-block two blending maps which contains for each sample (x) the blending weights w0(x) and w1(x) associated to the first predictor block P0 and the second predictor block P1 respectively. The purpose of this map is to facilitate the description of the embodiments and then it may be virtual, meaning it may be not computed or stored in memory system. In case of traditional bi-prediction, the 2 maps are uniform equal to ½. In case of GBi, the 2 maps are uniform equal to ⅜ and ⅝ respectively for example. In case of MH, w0(x)=w_intra(x) and w1(x)=w_inter(x) for example.

Several embodiments are described for determining the boundary strength BS used in the generic method for deblocking a part of an image, the embodiments may be arranged together according to any combination of the several embodiments.

A First Embodiment of Deblocking Filter

The first embodiment comprises a deblocking filter wherein the boundary strength is adapted to the number of samples and the relative weight of samples used in bi-prediction or weighed bi-prediction. This embodiment is advantageously well adapted in case one sub-block on one side of the boundary uses geometric partition or GBi.

For a given sub-block, the process 320 of FIG. 3 is modified as follows:
  a) if at least one sample in the sub-block is bi-predicted, then the sub-block is considered as bi-predicted for the determination of BS (as for instance sb2 and sb3 according to the blending map of the right of FIG. 7).
  b) In a variant, if the relative number of samples using bi-prediction in the sub-block is superior to a threshold, then the sub-block is considered as bi-predicted for the determination of BS (for instance sb3, having 14 bi-predicted samples according to the blending map of the right of FIG. 7, is considered as bi-predicted while sb2, having 3 bi-predicted samples according to the blending map of the right of FIG. 7, is considered as unidirectional predicted).
  c) In a variant, the computation of the number of bi-predicted samples in the sub-block excludes the samples for which one blending weight (w0($x$) or w1($x$)) is below a threshold or level (e.g. th=¼). These samples are considered as unidirectional predicted.
  d) In a variant, let denote n0 the relative number of samples using reference 0 for the prediction and let denote n1 the relative number of samples using the reference 1 for the prediction, if n0/(n0+n1) and n1/(n0+n1) are superior to a threshold, then the sub-block is considered as bi predicted for the determination of BS.

According to a non-limiting value, in b), c) and d), threshold or level is zero.

Advantageously, the threshold is, for instance, hard coded inside a Look Up Table indexed by the size of the block and the partition type.

A Second Embodiment of Deblocking Filter

The second embodiment comprises a deblocking filter wherein the boundary strength is locally adapted to the relative weight of samples used in combining inter and intra predicted samples or in combining inter and inter predicted samples. This embodiment is advantageously well adapted in case one sub-block on one side of the boundary uses MH.

Considering a sub-block using MH-inter-intra:
  a) the areas of the block where w_intra(x) is superior to a threshold/level are considered as intra. For example, in case of the MH-inter-intra example of FIG. 5, the first 3 top areas are considered as intra.
  b) the areas of the block where w_inter(x) is superior to a threshold/level are considered as inter. If the inter-prediction is bi-prediction (or uni-directional), the area is considered bi-prediction (resp. uni-directional). For example, in case of the MH-inter-intra example of FIG. 5, the last bottom area (w_inter(x)=⅝) is considered as inter.

Note that as previously, in a variant, the threshold or level is zero.

Besides, in a variant, the threshold is hard coded inside a Look Up Table indexed by the size of the block and the intra direction used.

Thus, according to a), in case the first prediction mode is one intra prediction mode and in case the weight of the first predictor (w_intra(x)) is above a level, the sample of the first block is considered as using intra prediction mode for determining the boundary strength. In particular, this applies to any of the intra prediction modes including directional intra prediction (for instance vertical intra prediction as illustrated on FIG. 5) and non-directional mode such as DC or planar. Besides, in case of planar or DC mode, equal weights are applied for the whole area of the block resulting in a same intra prediction mode for the whole area of the block. According to the original DBF intent, BS is set to strong (BS=2) in case the first block P or second block Q is Intra, thus in case the first prediction mode is one intra prediction mode and in case the weight of the first predictor (w_intra(x)) is above a level, the boundary strength is set to strong. In a particular variant corresponding to CIIP (MH-Inter-Intra wherein intra is planar), BS is set to strong (BS=2) for the block.

Besides, according to b), in case the first prediction mode is one inter prediction mode and in case the weight of the first predictor (w_inter(x)) is above a level, the sample of the first block is considered as using inter prediction mode for determining the boundary strength. In particular, this applies to any of the inter prediction modes including uni-directional and bi-directional inter prediction. Accordingly, in case the first prediction mode is an inter bi-directional prediction mode then the sample of the first block is considered as using inter bi-directional prediction mode for determining the boundary strength, and respectively in case the first prediction mode is an inter uni-directional prediction mode, the sample of the first block is considered as using inter uni-directional prediction mode for determining the boundary strength. Then, different variant checks, regarding the reference index and motion vector differences are processed according to the bidirectional or unidirectional inter prediction mode.

Considering a sub-block using MH-inter-inter, with P0 bi-predicted and P1 uni-directional predicted:
  c) the areas of the block where w0($x$) is superior to a threshold/level are considered as bi-predicted, while the areas of the block where w1($x$) is superior to a threshold are considered as uni-predicted.
  d) In a variant, if at least P0 or P1 is bi-predicted and {w0($x$);w1($x$)} are both superior to a threshold, then check.1 and check.2 are changed as:

if for all pair values of $(i,j)$:ref-$i_P \neq$ ref-$j_Q$     (check.1)

if for one pair value $(i,j)$ with ref-$i_P$=ref-$j_Q$:|MV$i_P$−MV$j_Q$|>threshold     (check.2)

with (i;j) such as ref-$i_P$>=0 and ref-$j_Q$>=0

Note that as previously, in a variant, the threshold or level is zero.

Advantageously, the threshold can be hard coded inside a Look Up Table indexed by the size of the block and the partition type.

A Third Embodiment of Deblocking Filter

The third embodiment comprises a deblocking filter wherein the boundary strength is adapted to the weight of samples used in the prediction. This embodiment is advantageously well adapted in case one sub-block on one side of the boundary uses Generalized Bi-prediction GBi or BCW.

Considering a sub-block where the GBi weights (w0($x$); w1($w$)) associated to reference-0 and reference-1 are not defaults:
  a) If w0($x$) or w1($x$) is inferior to a threshold, then the block is considered as uni-directional prediction {MV1,ref-1} (or MV0,ref-0 resp.) in steps (320,330), and only {MV1,ref-1} (or MV0,ref-0 resp.) is used in (340).

A Fourth Embodiment of Deblocking Filter

The fourth embodiment comprises a deblocking filter wherein the motion vectors are normalized with POC difference for determining boundary strength. In case the first block P and the second block Q have different reference indexes, test (320) is inferred to "false" and for (340) the MV value of Q (or P) is re-scaled to same POC as P (or Q respectively).

A Fifth Embodiment of Deblocking Filter

The fifth embodiment comprises a deblocking filter wherein determining boundary strength comprises a test (additional condition) on whether the coding mode of one of the blocks at boundary is at least one of MH, GBi, bi-prediction.

Figure 9:
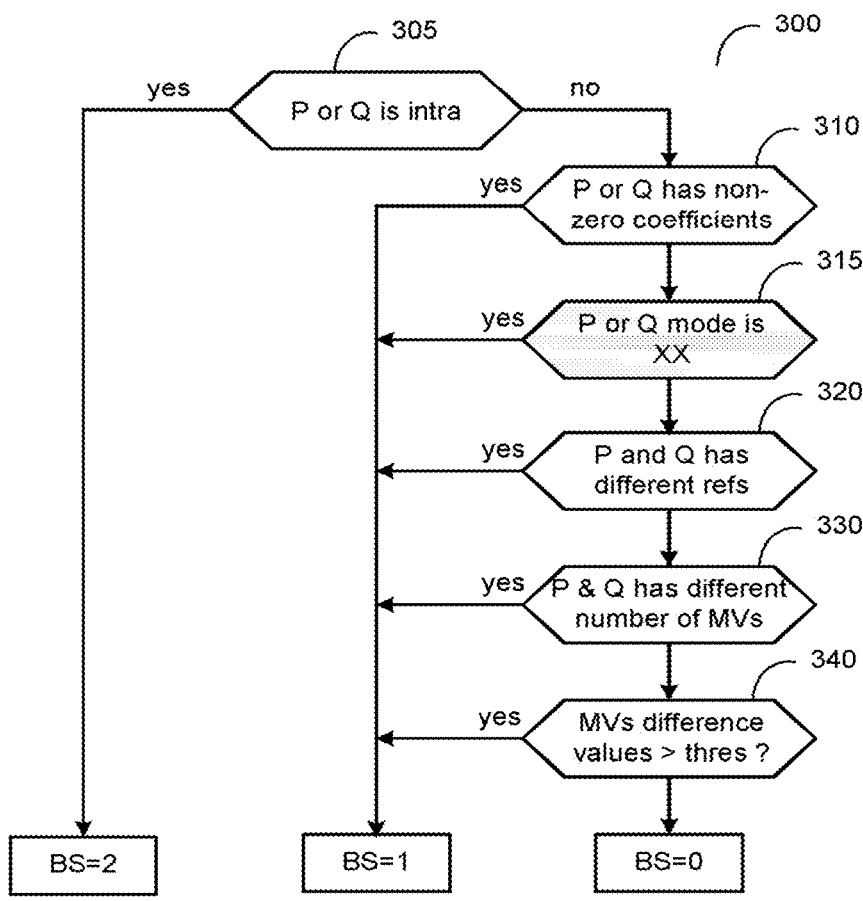
FIG. 9 illustrates a flowchart of a determination of the Boundary Strength in a deblocking filter method according to a particular embodiment.

FIG. 9 illustrates a flowchart of a determination of the Boundary Strength in a deblocking filter method according to the fifth embodiment. The determination of BS (300) is modified to include an additional condition (315) on the coding mode (XX) of the first block P or the second block Q. If the determination of BS follows the scheme described in FIG. 3, this additional condition may be placed before/after/in-between one of the conditions (310,320,330,340) as depicted in one non-limiting example in FIG. 9. According to non-limiting examples, XX is MH and/or GBi and/or bi-prediction. According to others non-limiting examples, determining the coding mode (XX) of the first block P or the second block Q is compatible with any of the variants described for the first, the second or third embodiment. For instance, the coding mode of a block is determined based on the number of samples and relative weight of samples used in bi-prediction, the coding mode of a block is determined based on the relative weight of samples used in MH. In case a coding mode Is determined as Intra, the BS is set to 2.

A Sixth Embodiment of Deblocking Filter

Figure 10:
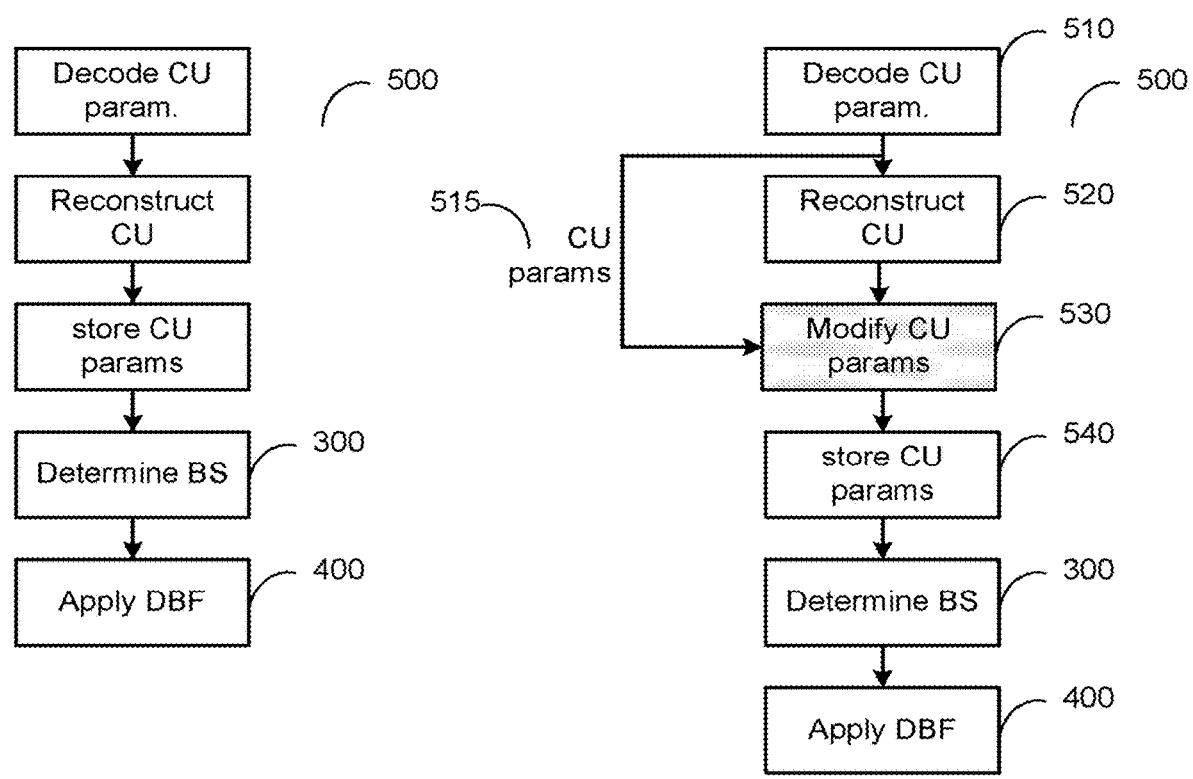
FIG. 10 illustrates 2 flowcharts of the storing of CU parameters used in the determination of the Boundary Strength (BS) parameter in a deblocking filter method according to a particular embodiment.

The sixth embodiment comprises encoder/decoder wherein coding parameters are modified and stored at the decoding/reconstructing for subsequent use in the deblocking filter (in determining of boundary strength parameter). FIG. 10 illustrates 2 flowcharts of the storing of CU parameters used in the determination of the Boundary Strength (BS) parameter in a deblocking filter method according to particular embodiments. The method for deblocking 500 a part of an image of the left and right of FIG. 10 is implemented in the in-loop filtering of an encoder or decoder. The method comprises a step 330 of determination of BS and a step 400 of application of the filter DBF.

In an embodiment represented on the left of FIG. 10, the determination of the BS parameters depends on a subset of CU (or sub-CU) parameters (e.g. P,Q modes, reference indexes, MV values) and is modified according to the previously exposed embodiments. In another embodiment represented on the right of FIG. 10, the determination of the BS parameters 300 is unchanged but some of this subset of CU (or sub-CU) parameters are modified 530 after their use for decoding 510 and reconstructing 520 the current CU (resp. sub-CU) and stored to be available by other process (e.g. DBF process). The modification of this subset of CU parameters is function of other decoded CU parameters 515. Therefore, this function allows making the value of BS (output of 300) depending on other parameters than the decoded subset of CU (or sub-CU) parameters.

For example, if coding mode is MH-inter-intra, and if w_intra(x) is superior to a threshold, then the coding mode is modified as intra before storage, so that in 300 the BS is set to strong (BS=2) corresponding to intra prediction mode.

In this way, one obtains same behavior as described the variant a) of the second embodiment relative to MH-inter-intra or CIIP.

In another example, if the relative number of samples using bi-prediction in the sub-block is superior to a threshold, then the sub-block the coding mode is modified as bi-predicted before storage, so that in step 300, the current CU is set as bi-predicted, one obtains same behavior as described in the variant b) of the first embodiment.

In a variant, these modified CU (or sub-CU) parameters stored for later use, are used by other CU (or sub-CUs) for another process than DBF. For example, the modified MV values can be later used for temporal motion prediction (e.g. ATMVP).

Additional Embodiments and Information

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 11:
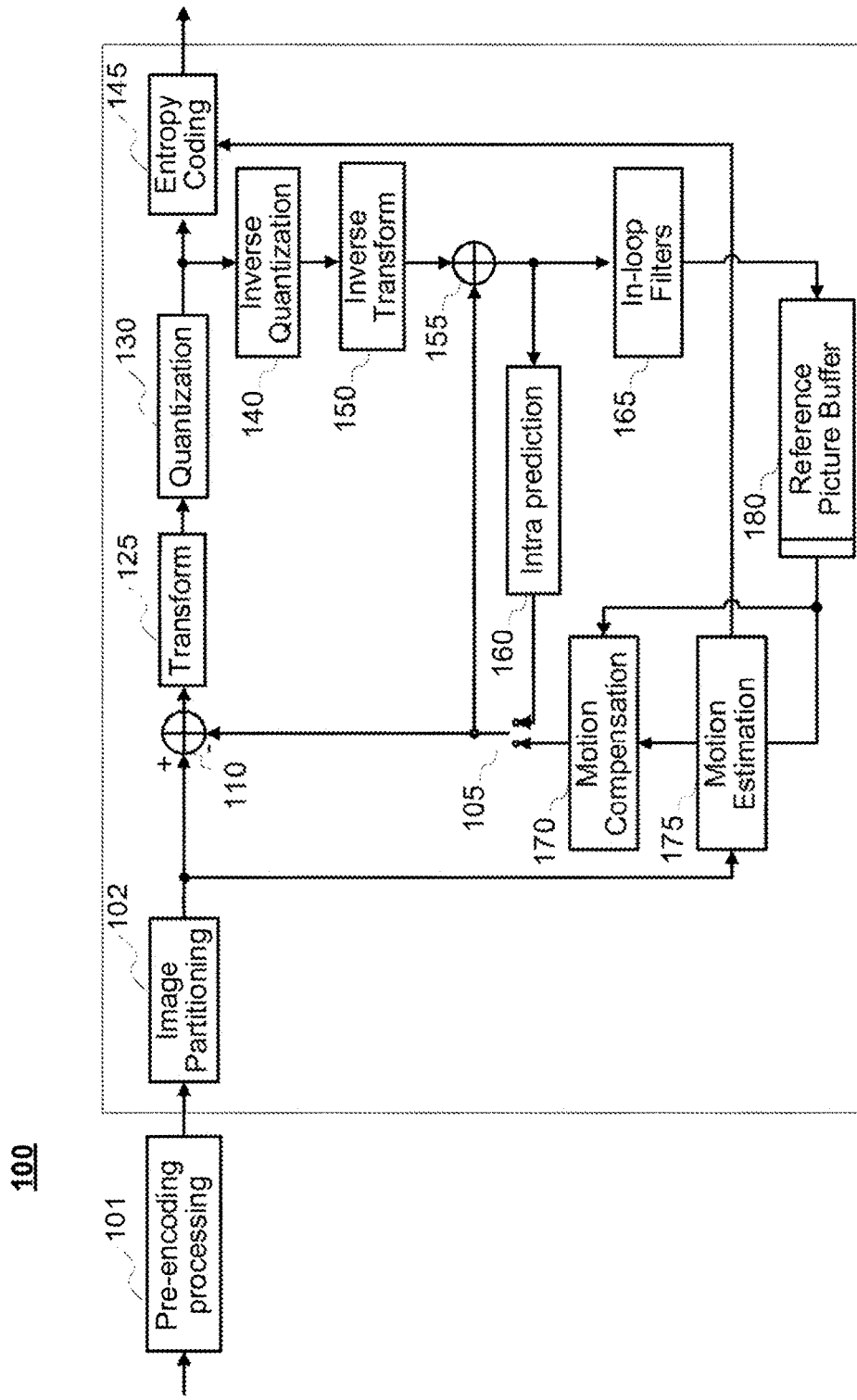
FIG. 11 illustrates a block diagram of an embodiment of video encoder in which various aspects of the embodiments may be implemented.
Figure 12:
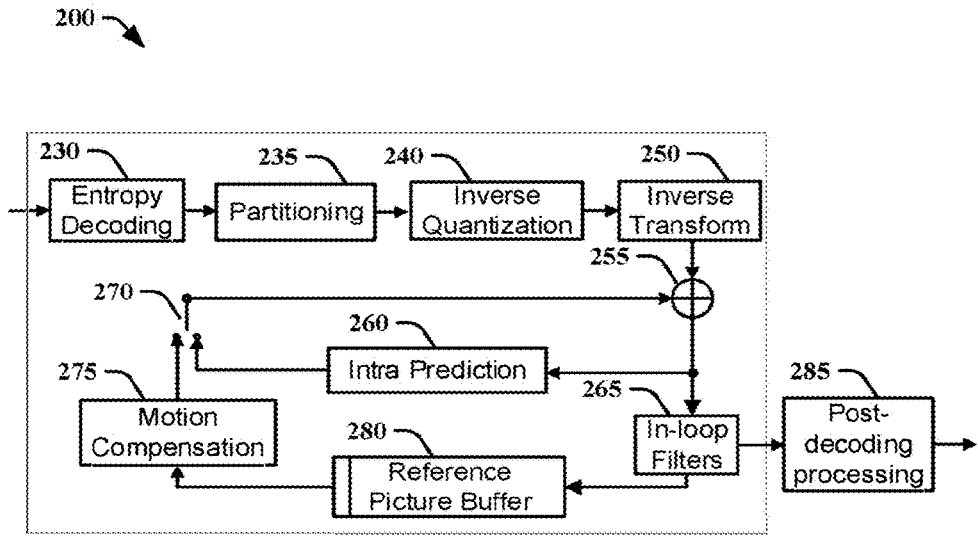
FIG. 12 illustrates a block diagram of an embodiment of video decoder in which various aspects of the embodiments may be implemented.
Figure 13:
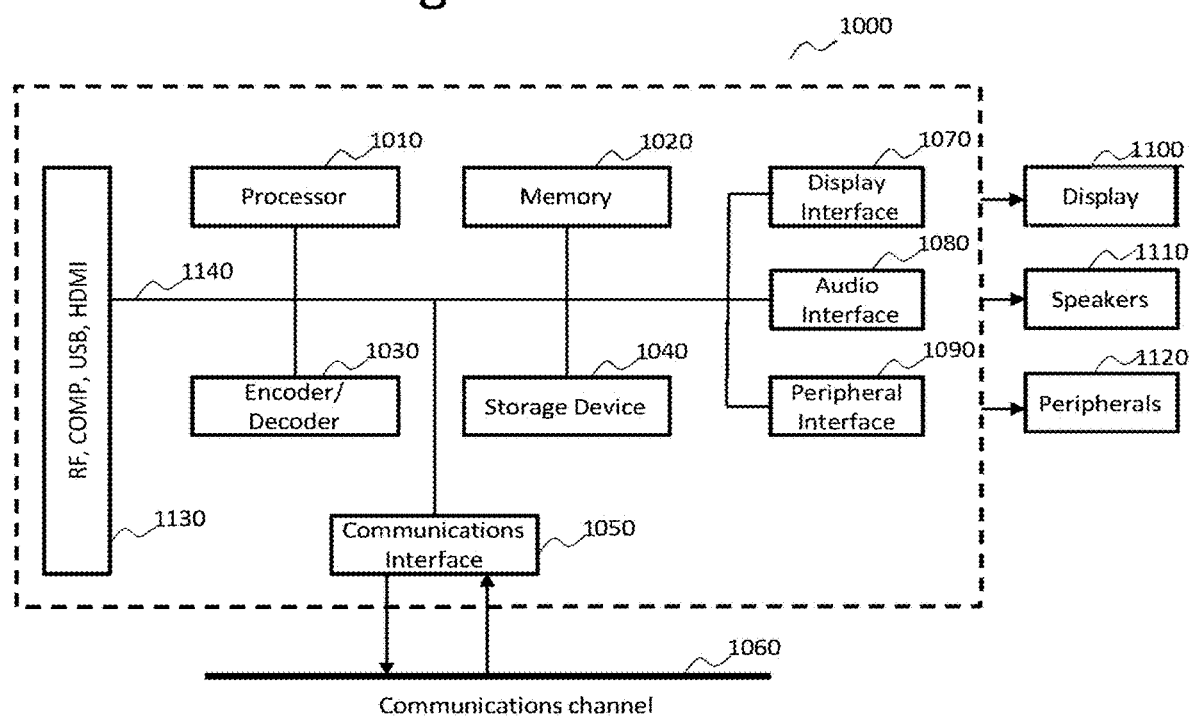
FIG. 13 illustrates a block diagram of an example apparatus in which various aspects of the embodiments may be implemented.

The aspects described and contemplated in this application can be implemented in many different forms. FIGS. 11, 12 and 13 below provide some embodiments, but other embodiments are contemplated and the discussion of FIGS. 11, 12 and 13 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the in-loop filters (165, 265) of a video encoder 100 and decoder 200 as shown in FIG. 11 and FIG. 12. Moreover, the present aspects are not limited to WC or HEVC, and can be applied, for example, to other standards and recommendations, whether pre-existing or future-developed, and extensions of any such standards and recommendations (including WC and HEVC). Unless indicated otherwise, or technically precluded, the aspects described in this application can be used individually or in combination.

Various numeric values are used in the present application, for example, the size of the sub-block 4×4 on which the DBF parameters are estimated. The specific values are for example purposes and the aspects described are not limited to these specific values.

FIG. 11 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 12 illustrates a block diagram of a video decoder 200. In the decoder 200, a bitstream is decoded by the decoder elements as described below. Video decoder 200 generally performs a decoding pass reciprocal to the encoding pass as described in FIG. 11. The encoder 100 also generally performs video decoding as part of encoding video data.

In particular, the input of the decoder includes a video bitstream, which can be generated by video encoder 100, The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 13 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television.

In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262). HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (NOMI) input terminal. Other examples, not shown in FIG. 13, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies). (ii) downconverting the selected signal, (iii) band-limiting again to a narrower band of frequencies to select (for example) a signal frequency band which can be referred to as a channel in certain embodiments, (iv) demodulating the downconverted and band-limited signal. (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HOW connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing. Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner, Additionally, various embodiments use wireless networks other than for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, reconstructing a picture, determining parameters of a deblocking filter and then filtering the reconstructed picture with determined deblocking filter parameters.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, reconstructing an encoded picture, determining parameters of a deblocking filter and then filtering the reconstructed picture with determined deblocking filter parameters.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B". "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B. and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for deblocking filter in de-artifact filtering. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination, across various claim categories and types. Further, embodiments can include one or more of the following features, devices, or aspects, alone or in any combination, across various claim categories and types:

Modifying the deblocking filter process applied in the decoder and/or encoder,

Enabling several advanced deblocking filters in the decoder and/or encoder,

Inserting in the signaling syntax elements that enable the decoder to identify the deblocking filter process to use, Selecting, based on these syntax elements, the deblocking filter to apply at the decoder, Adapting deblocking filter parameters in the decoder and/or encoder, Adapting the boundary strength of a deblocking filter in case blocks at boundary are a combination of non-square or non-rectangular blocks and/or the combination of unequal and/or spatially variable weighting, Adapting the filter strength of a deblocking filter in case blocks at boundary are a combination of non-square or non-rectangular blocks and/or the combination of unequal and/or spatially variable weighting, Determining a blending map for each sample of a block representative of the weighted combination used in prediction of each sample, Adapting the boundary strength to the number of samples and/or to the weight of samples used in bi-prediction, Adapting the boundary strength to the relative weight of samples used in combining inter and intra predicted samples or in combining inter and inter predicted samples, Adapting the boundary strength to the weight of samples used in the prediction, Normalizing the motion vectors using PDC difference of refence frames for determining boundary strength, Determining boundary strength comprises a test on whether the prediction mode of one of the blocks at boundary is at least one of MH, GBi or bi-prediction, Modifying coding parameters and storing the modified parameters for subsequent use in the deblocking filter (for instance in determining of boundary strength parameters).

A bitstream or signal that includes one or more of the described syntax elements, or variations thereof, A bitstream or signal that includes syntax conveying information generated according to any of the embodiments described, Inserting in the signaling syntax elements that enable the decoder to adapt deblocking filter in a manner corresponding to that used by an encoder.

Creating and/or transmitting and/or receiving and/or decoding a bitstream or signal that includes one or more of the described syntax elements, or variations thereof, Creating and/or transmitting and/or receiving and/or decoding according to any of the embodiments described, A method, process, apparatus, medium storing instructions, medium storing data, or signal according to any of the embodiments described, A TV, set-top box, cell phone, tablet, or other electronic device that performs adaptation of deblocking filter parameters according to any of the embodiments described, A TV, set-top box, cell phone, tablet, or other electronic device that performs adaptation of deblocking filter parameters according to any of the embodiments described, and that displays (e.g. using a monitor, screen, or other type of display) a resulting image, A TV, set-top box, cell phone, tablet, or other electronic device that selects (e.g. using a tuner) a channel to receive a signal including an encoded image, and performs adaptation of deblocking filter parameters according to any of the embodiments described, A TV, set-top box, cell phone, tablet, or other electronic device that receives (e.g. using an antenna) a signal over the air that includes an encoded image, and performs adaptation of deblocking filter parameters according to any of the embodiments described.

The invention claimed is:

1. A method comprising:
decoding a part of an image;
determining at least one boundary between a first block of samples and a second block of samples, the first block and second block belonging to the decoded image part;
determining a boundary strength of a deblocking filtering based on at least a prediction mode of the first block; and
filtering samples of the first block and of the second block based on the boundary strength;
wherein when the first block of samples belongs to a geometric partitioning mode inter block, the first block resulting from a weighted combination of a first predictor and a second predictor, the prediction mode of the first block used in the determining of the boundary strength is one of an inter bi-directional prediction mode or an inter uni-directional prediction mode and the prediction mode of the first block used in the determining of the boundary strength is correlated with a weight associated with at least a sample in the first predictor or with a weight associated with at least a sample in the second predictor;
wherein the prediction mode of the first block used in the determining of the boundary strength is:
an inter bi-directional prediction mode in case the weight of a sample in the first predictor is above a level and the weight of a sample in the second predictor is above a level; and
an inter uni-directional prediction mode in case the weight of a sample in the first predictor is equal to or less than a level or the weight of a sample in the second predictor is equal to or less than a level.

2. The method of claim 1, wherein prediction mode of the first block used in the determining of the boundary strength is an inter bi-directional prediction mode in case a number of samples in the first predictor having a weight above a level is higher than a sample amount and a number of samples in the second predictor having a weight above the level is higher than the sample amount.

3. The method of claim 1, wherein prediction mode of the first block used in the determining of the boundary strength is an inter uni-directional prediction mode in case a number of samples in the first predictor having a weight above a level is lower or equal than a sample amount or in case a number of samples in the second predictor having a weight above a level is lower or equal than the sample amount.

4. The method of claim 1, wherein the weight of a sample in the first predictor is equal to or less than a level or the weight of a sample in the second predictor is equal to or less than a level, and wherein the level is set to zero.

5. The method of claim 1, wherein the greater a distance of the sample with an edge of the geometric partitioning mode inter block, the smaller the weight associated with the at least a sample in the first predictor or the smaller the weight associated with the at least a sample in the second predictor.

6. The method of claim 1, wherein the first block of samples and a second block of samples are 4×4 sized blocks.

7. An apparatus comprising:
at least one processor configured to:
decode a part of an image;
determine that at least one boundary between a first block of samples and a second block of samples, the first block and second block belonging to the decoded image part;
determine a boundary strength of a deblocking filter based on at least a prediction mode of the first block; and
apply the deblocking filter to samples of the first block and of the second block based on the boundary strength;
wherein when the first block of samples belongs to a geometric partitioning mode inter block, the first block resulting from a weighted combination of a first predictor and a second predictor, the prediction mode of the first block used to determine the boundary strength is one of an inter bi-directional prediction mode or an inter uni-directional prediction mode and the prediction mode of the first block used to determine the boundary strength is correlated with a weight associated with at least a sample in the first predictor or with a weight associated with at least a sample in the second predictor;
wherein the prediction mode of the first block used to determine the boundary strength is:
an inter bi-directional prediction mode in case the weight of a sample in the first predictor is above a level and the weight of a sample in the second predictor is above a level; and
an inter uni-directional prediction mode in case the weight of a sample in the first predictor is equal to or less than a level or the weight of a sample in the second predictor is equal to or less than a level.

8. The apparatus of claim 7, wherein prediction mode of the first block used to determine the boundary strength is an inter bi-directional prediction mode in case a number of samples in the first predictor having a weight above a level is higher than a sample amount and a number of samples in the second predictor having a weight above the level is higher than the sample amount.

9. The apparatus of claim 7, wherein prediction mode of the first block used to determine the boundary strength is an inter uni-directional prediction mode in case a number of samples in the first predictor having a weight above a level is lower or equal than a sample amount or in case a number of samples in the second predictor having a weight above a level is lower or equal than the sample amount.

10. The apparatus of claim 7, wherein the weight of a sample in the first predictor is equal to or less than a level or the weight of a sample in the second predictor is equal to or less than a level, and wherein the level is set to zero.

11. The apparatus of claim 7, wherein the greater a distance of the sample with an edge of the geometric partitioning mode inter block, the smaller the weight associated with the at least a sample in the first predictor or the smaller the weight associated with the at least a sample in the second predictor.

12. The apparatus of claim 7, wherein the first block of samples and a second block of samples are 4×4 sized blocks.

13. A method of encoding an image, comprising:
reconstructing a part of the image;
determining at least one boundary between a first block of samples and a second block of samples, the first block and second block belonging to the reconstructed image part;
determining a boundary strength of a deblocking filtering based on at least a prediction mode of the first block; and
filtering samples of the first block and of the second block based on the boundary strength;
wherein when the first block of samples belongs to a geometric partitioning mode inter block, the first block resulting from a weighted combination of a first predictor and a second predictor, the prediction mode of the first block used in the determining of the boundary strength is one of an inter bi-directional prediction mode or an inter uni-directional prediction mode and the prediction mode of the first block used in the determining of the boundary strength is correlated with a weight associated with at least a sample in the first predictor or with a weight associated with at least a sample in the second predictor;
wherein the prediction mode of the first block used in the determining of the boundary strength is:
an inter bi-directional prediction mode in case the weight of a sample in the first predictor is above a level and the weight of a sample in the second predictor is above a level; and
an inter uni-directional prediction mode in case the weight of a sample in the first predictor is equal to or less than a level or the weight of a sample in the second predictor is equal to or less than a level.

14. An apparatus comprising:
at least one processor to encode an image, configured to:
reconstruct a part of the image;
determine that at least one boundary between a first block of samples and a second block of samples, the first block and second block belonging to the reconstructed image part;
determine a boundary strength of a deblocking filter based on at least a prediction mode of the first block; and
apply the deblocking filter to samples of the first block and of the second block based on the boundary strength;
wherein when the first block of samples belongs to a geometric partitioning mode inter block, the first block resulting from a weighted combination of a first predictor and a second predictor, the prediction mode of the first block used to determine the boundary strength is one of an inter bi-directional prediction mode or an inter uni-directional prediction mode and the prediction mode of the first block used to determine the boundary strength is correlated with a weight associated with at least a sample in the first predictor or with a weight associated with at least a sample in the second predictor;
wherein the prediction mode of the first block used to determine the boundary strength is:
an inter bi-directional prediction mode in case the weight of a sample in the first predictor is above a level and the weight of a sample in the second predictor is above a level; and
an inter uni-directional prediction mode in case the weight of a sample in the first predictor is equal to or less than a level or the weight of a sample in the second predictor is equal to or less than a level.

15. The method of claim 1, wherein the first block results from a pixelwise weighted combination of a first predictor and a second predictor along an edge.

16. The apparatus of claim 7, wherein the first block results from a pixelwise weighted combination of a first predictor and a second predictor along an edge.

17. The method of claim 13, wherein the first block results from a pixelwise weighted combination of a first predictor and a second predictor along an edge.

18. The apparatus of claim 14, wherein the first block results from a pixelwise weighted combination of a first predictor and a second predictor along an edge.

* * * * *